US006627694B1

(12) United States Patent
Luca

(10) Patent No.: US 6,627,694 B1
(45) Date of Patent: Sep. 30, 2003

(54) SEPARATING AGENT WHICH CAN BE USED FOR THE MANUFACTURE OF PRODUCTS IN THE FORM OF SLABS CONSISTING OF A GRANULATE OR PARTICLES OF STONE MATERIAL BONDED WITH A HARDENING RESIN

(76) Inventor: Toncelli Luca, Viale Asiago 34, Bassano del Grappa (Vicenza) (IT), 36061

( * ) Notice: Subject to any disclaimer, the term of this patent is extended or adjusted under 35 U.S.C. 154(b) by 0 days.

(21) Appl. No.: 09/654,428

(22) Filed: Sep. 1, 2000

(30) Foreign Application Priority Data

Sep. 3, 1999 (IT) ......................................... TV99A0094

(51) Int. Cl.⁷ ............................................... C08L 29/04
(52) U.S. Cl. ...................... 524/503; 523/171; 524/386; 524/588
(58) Field of Search ........................... 523/171; 524/386, 524/588, 503

(56) References Cited

U.S. PATENT DOCUMENTS 4,204,820 A  5/1980  Toncelli ........................ 425/89

5,283,231 A  *  2/1994  Morgan et al. .............. 504/148

FOREIGN PATENT DOCUMENTS

| EP | 0786325 A1 | 7/1997 | ........... B29C/67/24 |
| IT | A-1056388 | 7/1975 | |
| WO | 99/21695 | 5/1999 | ........... B29C/67/24 |

* cited by examiner

*Primary Examiner*—Edward J. Cain
(74) *Attorney, Agent, or Firm*—Darby & Darby

(57) ABSTRACT

The description relates to a new composition which can be used for the preparation of a separating agent which in turn can be used for the manufacture of products in the form of slabs consisting of a granulate or particles of stone material bonded with a hardening resin; this composition essentially consists of:

(a) glycerine in a quantity of 2–8 parts by weight;
(b) an agent with an anti-foaming action in a quantity of 0.1–0.5 parts by weight;
(c) an agent with a levelling action in a quantity of 0.2–0.8 parts by weight;
(d) a polyvinyl alcohol in a quantity of 5–15 parts by weight. 80–120 parts of water are added to this composition in order to obtain the desired separating agent.

13 Claims, No Drawings

SEPARATING AGENT WHICH CAN BE USED FOR THE MANUFACTURE OF PRODUCTS IN THE FORM OF SLABS CONSISTING OF A GRANULATE OR PARTICLES OF STONE MATERIAL BONDED WITH A HARDENING RESIN

The present invention relates to a new composition which can be used as a separating agent for the manufacture of products in the form of slabs consisting of a granulate or particles of stone material bonded with a hardening resin.

The method for the manufacture of slabs to which the present invention relates is one in which a mixture consisting of a granulate of selected particle size and a synthetic resin is deposited in metered quantities on a conveyor belt which is made to advance to a moulding station where it undergoes a vacuum compacting action with simultaneous application of a vibrating movement of predefined frequency and then to a station for hardening of the resin (preferably by means of the action of a catalyst and/or heat).

Prior to the moulding station, the upper surface of the metered quantity of mixture deposited on the conveyor belt is covered with a sheet or layer of protective material which prevents the pressing ram of the press from soiling the mixture.

In the past this protective sheet material was paper (IT-A-1,056,388 and IT-A1,117,346), use of which, however, was accompanied by a few secondary problems downstream of the actual production line. After hardening of the resin, the sheet of paper in fact adhered firmly to the surface of the hardened slab and removal from the slab surface proved to be very difficult; for this reason, during finishing of the slab, it was necessary to perform a special operation for mechanical removal of the protective paper.

Subsequently an improvement was introduced (described and claimed in EP-A-0.786.325) whereby the layer or sheet of paper is replaced by a sheet of elastic material, preferably rubber, such that, at the end of the stage involving hardening of the bonding resin, the rubber sheet may be removed by means of tearing from the surface of the finished slab and subsequently reused.

In a preferred embodiment of the abovementioned improvement, the support, on which the mixture is deposited before being transferred to the vacuum and vibration compacting station, is also protected with a similar sheet made of elastic material, in particular rubber.

The mixture deposited on the support and enclosed between the two rubber sheets after the moulding stage is in the form of a slab, at the edges of which the two protective rubber sheets are joined to one another with their respective edges superimposed, enclosing in a substantially complete manner the rough-formed slab which has not yet undergone the stage of hardening of the resinous binder. Since, during compaction, an albeit minimal part of mixture inevitably forms a burr located between the two edges, after hardening of the resinous binder this burr forms on the rubber sheets incrustations which are difficult to remove, due to the fact that, during hardening, the two rubber edges do not remain in contact with each other, resulting in separation of the not yet hardened burr from the body of the product.

In order to overcome this problem, still according to the previously known method, a separating liquid is applied to the two edges to be joined together, immediately prior to use along the production line.

Despite these measures it is still necessary to perform operations involving cleaning of the two rubber sheets, in particular along the two mating edges, said operations being certainly less difficult than the prior operations associated with removal of the protective paper, but nevertheless requiring an additional operation in the production cycle.

WO 99/21695 proposes an alternative solution which does not require the use of the separating agent: the flat configuration of the bottom sheet is in fact replaced by a shaped configuration, comprising a flat bottom and a perimetral border projecting from said flat bottom over a predetermined height, so as to define a seat with dimensions corresponding in plan view to those of the slab to be obtained, but the aforementioned perimetral border is provided with a height which is smaller, by a predetermined value, than that of the final slab which is to be obtained so that, after the compacting stage, a space of predetermined thickness remains between the perimetral edge of the upper sheet and the top of the aforementioned border.

Surplus mixture material fills this space of predetermined thickness during the vibrating compression under vacuum, said material subsequently remaining attached to the edge of the slab during the hardening stage.

When, after the stage involving hardening of the resinous binder, the final slab is released, by means of tearing, from the two rubber sheets, a rough hardened slab is obtained, said slab having perimetrally a border of hardened material which may be easily removed during the usual finishing operations carried out on a slab of stone material.

However, both in the method described in EP-A-0.786.325 and in the method described in WO 99/21695, a further problem consists in the deterioration of the rubber sheets caused by the styrene present in the resins—something which obviously reduces significantly the working life of the said rubber sheets.

The main object of the present invention is to solve these problems in an industrially advantageous manner.

It has now been discovered that there is a particular composition which, when applied over the whole surface of the two rubber sheets, forms a film which performs in an excellent manner the function of a separating agent and, performs an additional function of protecting the rubber, reducing the wear of the latter and therefore increasing the number of slabs which can be obtained before having to replace the rubber sheets.

This composition essentially consists of four components which are already known per se and to which water is added immediately prior to use; said components are indicated hereinbelow, together with their weight ratios:

(a) glycerine in a quantity of 2–8 parts by weight;
(b) an agent with an anti-foaming action in a quantity of 0.1–0.5 parts by weight;
(c) an agent with a levelling action in a quantity of 0.2–0.8 parts by weight;
(d) a polyvinyl alcohol in a quantity of 5–15 parts by weight.

The term "agent with an anti-foaming action" is understood as referring to any substance which is able to prevent or in any case limit substantially the formation of foam in an aqueous solution or mixture, while the term "levelling agent" is understood as meaning a compound which is able to modify the surface tension of a fluid so as to facilitate the formation of a film.

The water is added in quantities of 80–120, preferably 90–110, parts by weight.

The present invention therefore relates principally to a composition for the preparation of a separating agent, characterized in that it contains the abovementioned components (a) to (d); the invention also relates to the separating agent obtained through the addition of water, the method for preparation thereof and the use of this separating agent for the manufacture of products in the form of slabs consisting of a granulate or particles of stone material bonded with a hardening resin.

According to a preferred embodiment of the present invention, the component (a) is present in a quantity of 5.5 parts by weight, the component (b) in a quantity of 0.3 parts by weight, the component (c) in a quantity of 0.5 parts by weight and the component (d) in a quantity of 10 parts by weight; the water is added in a quantity of 100 parts by weight.

As regards the particular qualitative characteristics of the individual components, the glycerine is preferably 90% glycerine, i.e. containing 10% by weight of water; said glycerine is commonly available on the market and is marketed, for example, by ITALSILVA SPA (IT) under the name "Glicerina 28 Bé 90%". The agent with an anti-foaming action preferably consists of a mixture of polymers and polysiloxanes, such as the mixture marketed by BYK-Chemie under the name BYK-024; the agent with a levelling action preferably consists of an aqueous solution of a polyether-modified polydimethylsiloxane, such as that marketed by BYK-Chemie (DE) under the name BYK-346. The polyvinyl alcohol generally consists of a mixture of polyvinyl alcohol with an average molecular weight of 30,000 Daltons; a 4% aqueous solution thereof has a viscosity of 5.0±1.0 CPS at 20° C.; a compound of this type is for example marketed by UNITIKA LTD (JP) under the name UP-050G.

In order to ensure easier storage and transportation of the product, since the component (d) is a powder while the components (a), (b) and (c) are liquids, the composition according to the present invention is normally stored (and may therefore be marketed) as a system comprising two separate components, i.e.:

a first component A, consisting essentially of the components (a), (b) and (c) in the weight ratios listed above and containing water in a quantity of 3.7 parts by weight;

and a second component B consisting essentially of the single component (d).

During preparation of the separating agent, the component A is preferably mixed at room temperature with 100 parts by water and stirred for about 10 minutes until full dispersion is achieved; then the component B is added and the mixture thus obtained is kept stirred for a period of at least three hours until a homogeneous, slightly opalescent and clot-free solution is obtained.

The solution thus obtained may then be sprayed over the whole surface of the rubber sheets such as those described in EP-A-0.786.325 and in WO 99/21695. After evaporation of the solution water, a homogeneous, elastic and non-porous film which is insoluble in organic solvents at the working temperatures (namely at temperatures of between 25 and 150° C.) and which has a high mechanical strength is formed on the surface of the rubber sheets.

The evaporation of the water is preferably accelerated by heating and ventilating the rubber sheets onto which the solution is sprayed; it is preferable to avoid boiling during evaporation of the water (temperatures below 90° C.) in order to prevent the formation of pockets and pores in the film.

The rubber sheets thus treated may therefore be used for the manufacture of products in the form of slabs consisting of a granulate or particles of stone material bonded with a hardening resin in accordance with the methods described in the abovementioned patent applications; once this treatment has been performed, the two rubber sheets may be easily removed by means of tearing without any incrustations or deposition of processing by-products being formed thereon, the film in fact remaining attached to the slab of stone agglomerate. It has also been observed that, after processing, the rubber sheets treated with the separating composition according to the present invention do not show signs of early wear or cracks and may therefore be reused for up to about 700 to 800 processing operations.

During industrial processing, both the component A and the component B are normally stored and used in quantities of 20 kg; in greater detail, the component A is preferably stored and used in 20 kg drums containing 11,100 grammes of component (a), 600 grammes of component (b), 1,000 grammes of component (c) and 7,300 grammes of water; the component B being in 20 kg bags. The components A and B are then mixed, prior to use, with about 200 liters of drinking water or industrial water free from impurities.

What is claimed is:

1. A composition that is applied to a sheet of elastic material to form a separating agent for slabs comprising a granulate or particles of a stone material bonded with a hardening resin, comprising:
   (a) glycerine in an amount of 2–8 parts by weight;
   (b) an anti-foaming agent in an amount of 0.1–0.5 parts by weight;
   (c) a levelling agent in an amount of 0.2–0.8 parts by weight; and
   (d) a polyvinyl alcohol in an amount of 5–15 parts by weight.

2. A composition according to claim 1, wherein the levelling agent is an aqueous solution of a polyether-modified polydimethylsiloxane.

3. A composition according to claim 1, wherein the polyvinyl alcohol is a 4% aqueous solution having a viscosity of 5.0±1.0 CPS at 20° C.

4. A composition according to claim 1, wherein the polyvinyl alcohol has an average molecular weight of 30,000 Daltons.

5. A separating agent for slabs comprising a granulate or particles of a stone material bonded with a hardening resin, comprising the composition of claim 1 in admixture with from 80–120 parts by weight of water.

6. The separating agent of claim 5, wherein the water is present in an amount of 90–110 parts by weight.

7. A method for preparing a separating agent for slabs comprising a granulate or particles of a stone material bonded with a hardening resin, comprising:
   (a) mixing 2–8 parts by weight of glycerine; 0.1–0.5 parts by weight of an anti-foaming agent and 0.2–08 parts by weight of a level agent with 80–120 parts by weight of water;
   (b) stirring the mixture thus obtained to effect dispersion;
   (c) adding 5–15 parts by weight of a polyvinyl alcohol to the mixture thus obtained; and
   (d) stirring the mixture thus obtained for at least three hours.

8. A method for treating a sheet of an elastic material used for protecting slabs of a granulate or particles of a stone material bonded with a hardening resin against damage during the manufacture thereof, comprising;
   (a) mixing 2–8 parts by weight of glycerine; 0.1–0.5 parts by weight of an anti-foaming agent and 0.2–08 parts by weight of a levelling agent with 80–120 parts by weight of water;
   (b) stirring the mixture thus obtained to effect dispersion;

(c) adding 5–15 parts by weight of a polyvinyl alcohol to the mixture; and (d) stirring the mixture for at least three hours to form a separating agent for the slabs;

(e) applying the separating agent over the surface of the elastic material sheet; and (f) evaporating the water content of the separating agent to form a film on the surface of the elastic material sheet.

9. A method of manufacturing a slab of a granulate or particles of a stone material bonded with a hardening resin, comprising:

(a) spraying the separating agent of claim 5 on a first elastic material sheet and a second elastic material sheet;

(b) evaporating the water from the separating agent to form a homogeneous, elastic, and non-porous film on the elastic material sheets;

(c) placing the first elastic material sheet on a support;

(d) depositing a slab of a granulate or particles of a stone material and a bonding resin on the non-porous film on the first elastic material sheet;

(e) placing the second elastic material sheet on the slab of a granulate or particles of a stone material and a bonding resin;

(f) molding the slab under heat or pressure to harden the resin; and (g) removing the elastic material sheets from the slab, leaving the non-porous films on the slabs without depositing any incrustations or processing by-products on the elastic material sheets.

10. The composition of claim 1 consisting essentially of:

(a) glycerine in an amount of 2–8 parts by weight;

(b) an anti-foaming agent in an amount of 0.1–0.5 parts by weight;

(c) a levelling agent in an amount of 0.2–0.8 parts by weight; and (d) a polyvinyl alcohol in an amount of 5–15 parts by weight.

11. The separating agent of claim 5 consisting essentially of the composition of claim 1 in admixture with from 80–120 parts by weight of water.

12. The method of claim 7 wherein the materials mixed in step (a) consist essentially of 2–8 parts by weight of glycerine; 0.1–0.5 parts by weight of an anti-foaming agent; 0.2–0.8 parts by weight of a levelling agent; and 80–120 parts by weight of water.

13. The method of claim 8 wherein the materials mixed in step (a) consist essentially of 2–8 parts by weight of glycerine; 0.1–0.5 parts by weight of an anti-foaming agent; 0.2–0.8 parts by weight of a levelling agent; and 80–120 parts by weight of water.

* * * * *